United States Patent
Delpuech et al.

(10) Patent No.: US 9,692,044 B2
(45) Date of Patent: Jun. 27, 2017

(54) LOW COST SI-BASED NEGATIVE ELECTRODES WITH ENHANCED CYCLING PERFORMANCE

(71) Applicants: Nathalie Delpuech, Didcot (GB); Driss Mazouzi, Nantes (FR); Bernard Lestriez, Nantes (FR); Dominique Guyomard, Sautron (FR); Lionel Roue, Quebéc (CA)

(72) Inventors: Nathalie Delpuech, Didcot (GB); Driss Mazouzi, Nantes (FR); Bernard Lestriez, Nantes (FR); Dominique Guyomard, Sautron (FR); Lionel Roue, Quebéc (CA)

(73) Assignees: Umicore, Brussels (BE); Centre National de la Recherche Scientifique, Paris (FR); Institut National de la Recherche Scientifique, Quebec (CA); Umicore Korea Ltd., Chunan (KR)

( * ) Notice: Subject to any disclaimer, the term of this patent is extended or adjusted under 35 U.S.C. 154(b) by 126 days.

(21) Appl. No.: 14/394,779

(22) PCT Filed: Apr. 4, 2013

(86) PCT No.: PCT/IB2013/052686
§ 371 (c)(1),
(2) Date: Oct. 16, 2014

(87) PCT Pub. No.: WO2013/156888
PCT Pub. Date: Oct. 24, 2013

(65) Prior Publication Data
US 2015/0093636 A1 Apr. 2, 2015
US 2015/0349328 A9 Dec. 3, 2015

Related U.S. Application Data

(60) Provisional application No. 61/625,189, filed on Apr. 17, 2012.

(30) Foreign Application Priority Data

Jul. 25, 2012 (EP) .................................. 12290254

(51) Int. Cl.
| | |
|---|---|
| H01M 2/16 | (2006.01) |
| H01M 4/134 | (2010.01) |
| H01M 4/04 | (2006.01) |
| H01M 4/1395 | (2010.01) |
| H01M 4/38 | (2006.01) |
| H01M 4/48 | (2010.01) |
| H01M 4/485 | (2010.01) |
| H01M 4/62 | (2006.01) |

(Continued)

(52) U.S. Cl.
CPC ......... H01M 4/134 (2013.01); H01M 4/0404 (2013.01); H01M 4/1395 (2013.01); H01M 4/366 (2013.01); H01M 4/386 (2013.01); H01M 4/483 (2013.01); H01M 4/485 (2013.01); H01M 4/622 (2013.01); H01M 10/052 (2013.01); H01M 10/0525 (2013.01); H01M 10/0567 (2013.01); H01M 10/0569 (2013.01); H01M 4/364 (2013.01); H01M 4/587 (2013.01); H01M 2004/027 (2013.01); H01M 2300/0025 (2013.01); H01M 2300/0034 (2013.01); H01M 2300/0037 (2013.01)

(58) Field of Classification Search
CPC ........... H01M 10/052; H01M 10/0525; H01M 10/0567; H01M 10/0569; H01M 2004/027; H01M 2300/0025; H01M 2300/0034; H01M 2300/0037; H01M 4/0404; H01M 4/134; H01M 4/1395; H01M 4/364; H01M 4/366; H01M 4/386; H01M 4/483; H01M 4/485; H01M 4/587
See application file for complete search history.

(56) References Cited

U.S. PATENT DOCUMENTS

| | | | | |
|---|---|---|---|---|
| 2004/0170898 | A1* | 9/2004 | Shibuya | H01M 2/0212 429/231.8 |
| 2006/0035149 | A1* | 2/2006 | Nanba | H01M 4/0471 429/218.1 |

(Continued)

FOREIGN PATENT DOCUMENTS

| | | |
|---|---|---|
| CN | 101034764 A | 9/2007 |
| CN | 102341938 A | 2/2012 |

(Continued)

OTHER PUBLICATIONS

Choi, Nam-Soon et al., "Effect of fluoroethylene carbonate additive on interfacial properties of silicon thin-film electrode", *Journal of Power Sources*, vol. 161 (2006), pp. 1254-1259.

(Continued)

*Primary Examiner* — Patrick Ryan
*Assistant Examiner* — Ben Lewis
(74) *Attorney, Agent, or Firm* — Brinks Gilson & Lione

(57) ABSTRACT

A rechargeable battery comprising a positive electrode, a negative electrode and an electrolyte, wherein: —the electrolyte comprises a SEI film-forming agent, and—the negative electrode comprises a micrometric Si based active material, a polymeric binder material and a conductive agent, wherein at least part of the surface of the Si based active material consists of Si—OCO—R groups, Si being part of the active material, and R being the polymeric chain of the binder material.

7 Claims, 8 Drawing Sheets

(51) Int. Cl.
  *H01M 10/052* (2010.01)
  *H01M 10/0569* (2010.01)
  *H01M 10/0525* (2010.01)
  *H01M 10/0567* (2010.01)
  *H01M 4/36* (2006.01)
  *H01M 4/587* (2010.01)
  *H01M 4/02* (2006.01)

(56) References Cited

U.S. PATENT DOCUMENTS

| | | | |
|---|---|---|---|
| 2007/0178386 A1 | 8/2007 | Takeda et al. | |
| 2008/0113271 A1* | 5/2008 | Ueda | H01M 4/134 429/231.95 |
| 2012/0088155 A1* | 4/2012 | Yushin | H01M 2/16 429/217 |
| 2012/0276451 A1* | 11/2012 | Lestriez | H01M 4/0416 429/217 |

FOREIGN PATENT DOCUMENTS

| | | |
|---|---|---|
| DE | 10 2009 034 799 A1 | 1/2011 |
| EP | 2 104 175 A2 | 9/2009 |
| EP | 2 333 879 A1 | 6/2011 |
| FR | WO 2010/086558 A * | 8/2010 ............ H01M 4/04 |
| JP | 2010-212144 A | 9/2010 |
| WO | WO 2006/129415 A1 | 12/2006 |
| WO | WO2010/000858 A1 | 1/2010 |
| WO | WO2010/086558 A1 | 8/2010 |
| WO | WO 2011/035876 A1 | 3/2011 |
| WO | WO 2011/060433 A1 | 5/2011 |
| WO | WO 2011/154692 A1 | 12/2011 |
| WO | WO 2012/000854 A1 | 1/2012 |

OTHER PUBLICATIONS

Ding, Ning, et al., "Improvement of cyclability of Si as anode for Li—ion batteries", *Journal of Power Sources*, vol. 192 (2009), pp. 644-651.

Hochgatterer, N.S., et al., "Silicon/graphite composite electrodes for high-capacity anodes: influence of binder chemistry on cycling stability", *Electrochemical and Solid-State Letters*, vol. 11, No. 5, (2008), pp. A76-A80.

Lestriez, B., et al., "On the binding mechanism of CMC in Si negative electrodes for Li—ion batteries", *Electrochemistry Communications*, vol. 9 (2007), pp. 2801-2806.

Japanese Office Action mailed Jan. 4, 2017 for corresponding JP Application No. 2015-506329 (English translation).

* cited by examiner

LOW COST SI-BASED NEGATIVE ELECTRODES WITH ENHANCED CYCLING PERFORMANCE

This application is a National Stage application of International Application No. PCT/IB2013/052686, filed Apr. 4, 2013, which claims the benefit of U.S. Provisional Application No. 61/625,189, filed Apr. 17, 2012. This application also claims priority under 35 U.S.C. §119 to European Patent Application No. 12290254.7, filed Jul. 25, 2012.

TECHNICAL FIELD AND BACKGROUND

This invention relates to a silicon based negative electrode for lithium-ion batteries where the association of micro-sized silicon, an electrode fabrication process and additives in electrolyte allows better electrochemical performances.

Lithium-ion batteries are the most widely used secondary systems for portable electronic devices. Compared to aqueous rechargeable cells, such as nickel-cadmium and nickel metal hydride, Li-ion cells have a higher energy density, higher operating voltages, lower self discharge and low maintenance requirements. These properties have made Li-ion cells the highest performing available secondary batteries.

The worldwide energy demand increase has driven the lithium-ion battery community to search for new generation electrode materials with high energy density. One of the approaches is to replace the conventional carbon graphite negative electrode material by another better performing active material, being a metal, metalloid or metallic alloy based on silicon (Si), tin (Sn) or aluminum (Al). These materials can provide much higher specific and volumetric capacity compared to graphite. On top of the specific composition of the negative electrode material, the surface properties of the particles—being constantly in contact with a reactive electrolyte—are playing a key role in the electrochemical behaviour of the resulting Li-ion battery.

As mentioned above, Si-based negative electrode materials could significantly enhance the energy density of the commercial lithium ion batteries. Silicon has the largest theoretical gravimetric capacity (3579 mAh/g) corresponding to the following reaction: $15Li + 4Si \rightarrow Li_{15}Si_4$, and a large volumetric capacity (2200 mAh/cm$^3$). However, the huge volume expansion upon lithium intercalation had never allowed reaching acceptable life characteristics for a use in rechargeable cells.

The synthesis of materials at the submicron or nanoscale is generally the solution to overcome the main drawbacks of these materials, and makes them suitable candidates for the replacement of graphite anodes. An interesting method to prepare submicron powders is plasma technology, as is disclosed in WO2008/064741 A1. Unfortunately, even for nanometric materials the high BET surface and the creation of a new silicon surface after each volume expansion causes a continuous decomposition of the battery's electrolyte, that results in a low coulombic efficiency of this material.

The use of binders favouring a more resilient bonding between the Si and the conductive carbon black particles than the standard polyvinylidene fluoride (PVDF) is also one of the favourite strategy to improve the electrode cohesion during the volumetric variation.

And finally some strategies use electrolytes containing a film-forming agent to improve the behaviour of the solid electrolyte interface (SEI) and thus to limit the continuous electrolyte degradation. Fluoro ethylene carbonate (FEC) and vinylidene carbonate (VC) are known examples of such SEI film-forming agents, see for example N-S. Choi et al. in J. Power Sources, 161 (2006) 1254. Flexible polycarbonate would be the major surface film component in FEC and VC-containing solutions. They would have a better ability to accommodate the volume variations of the Si phase, thus limiting the contact between the electrode and the liquid electrolyte. This would reduce the amount of SEI products precipitating and accumulating inside the electrode at each cycle.

With respect to the selection of the binder and the electrode processing, several publications and patents highlighted improvements of the capacity retention of silicon-based electrodes prepared with a carboxymethylcellulose (CMC) binder.

The suitability of the CMC binder for silicon based-anodes has many different explanations, including the presence of original and indispensable polymer-particle interaction. The CMC-efficiency could be ascribed to its extended conformation in solution, which facilitates the formation of an efficient network. The slurry pH during the electrode preparation (typically around pH 3) was also demonstrated to be a key parameter to obtain astonishing cyclability improvements, as disclosed in D. Mazouzi et al. in J. Electrochem. Solid-State Lett. 12 (2009) A215. This results on the one hand from the physical cross-linking of the CMC chains in the solution at pH 3, and on the other hand from an ester-like Si—CH$_3$COO—R covalent bond between the binder and the silicon surface, by the reaction of the CMC carboxyl groups with the OH groups at the surface of the thin SiO$_2$ layer surrounding the Si particles.

It is an object of the present invention to further improve the cycling performance (more in particular the capacity retention) of Si based negative electrode materials, and in the meantime offer a cheaper material that exhibits the same and even better performances than the known Si nanomaterials.

SUMMARY

Viewed from a first aspect, the invention can provide a rechargeable battery comprising a positive electrode, a negative electrode and an electrolyte, wherein:
  the electrolyte comprises a SEI film-forming agent, and
  the negative electrode comprises a micrometric Si based active material, a polymeric binder material and a conductive agent, wherein at least part of the surface of the Si based active material consists of Si—OCO—R groups, Si being part of the active material, and R being the polymeric chain of the binder material.

The invention proposes to combine knowledge developed in the area of the electrode formulation with an electrolyte containing additives that contain flexible polycarbonate polymers, and using not a submicron or nano scale silicon powder but a micrometric size silicon based powder. We define a micrometric powder as a powder with a D50 between 1 and 15 μm. Powders having a narrower particle distribution, as expressed in the increasingly stringent D50, D80 and D10 limitations above, will improve the synergetic function of the different elements of the invention. This synergetic function is exemplified in the Examples in the Detailed Description. Note that a nanopowder can be defined as having a D80 less than 1 μm, and usually 50 nm<D80<200 nm.

In another embodiment the Si based active material consists of either one or more of silicon having a SiO$_x$ surface layer, with 0<x<2, the surface layer having an average thickness between 0.5 nm and 10 nm, SiO, and a compound having the formula SiO$_x$·(M$_a$O$_b$)$_y$, with 0<x<1 and 0≤y<1, wherein a and b are selected to provide electro neutrality, and wherein M is either one or more of Ca, Mg, Li, Al, and Zr. The negative electrode may further comprise either one or both of micrometric graphite and a nanometric Si compound, both being known negative electrode active materials.

The SEI film-forming agent may be either one or more of the group consisting of fluoro ethylene carbonate (FEC), vinylidene carbonate (VC), vinyl ethylene carbonate, phenyl ethylene carbonate, phenyl vinylene carbonate, catechol carbonate, allyl methyl carbonate, allyl ethyl carbonate, vinyl acetate, acrylonitrile and 2-cyanofuran. The polymeric binder material may be a compound with carboxyl functional groups, such as carboxymethylcellulose (CMC) or poly (acrylic acid) (PAA), the binder being insoluble in a carbonate or ester based solvent. The conductive agent may comprise a carbon powder, and preferably consists of carbon black.

In one embodiment, the negative electrode comprises between 75 and 85 wt % of Si based active material. Electrode compositions such as 90 wt % of micrometric silicon, 5 wt % of carbon black and 5 wt % of carboxymethyl cellulose; or 50 wt % of micrometric silicon, 25 wt % of carbon black and 25 wt % of carboxymethyl cellulose are also embodiments of the invention, but an optimum is reached around 80 wt % Si based active material, such as in a composition 80 wt % of micrometric silicon, 12 wt % of carbon black and 8 wt % of carboxymethyl cellulose (CMC).

Viewed from a second aspect, the invention can provide a process for preparing a rechargeable battery comprising a positive electrode, a negative electrode and an electrolyte, comprising the steps of:

providing a battery container, current collectors and separators, providing a positive electrode, providing an electrolyte comprising a SEI-film forming agent, providing a negative electrode comprising a micrometric Si based active material, a polymeric binder material having carboxyl functional groups and a conductive agent, wherein at least part of the surface of the Si based active material consists of Si—OCO—R groups, Si being part of the active material, and R being the polymeric chain of the binder material, and assembling the current collectors, separator, electrolyte, the positive and the negative electrode material in the container.

In one embodiment the powder may have a D80 between 1 and 15 μm. In another embodiment it has a D50 between 1 and 10 μm. In still another embodiment D10 is between 0.5 and 2 μm. The negative electrode may further comprise either one or both of micrometric graphite and a nanometric Si compound. The SEI film-forming agents enumerated before may be used in the process. The used polymeric binder material may be a compound with carboxyl functional groups, such as carboxymethylcellulose (CMC) or poly (acrylic acid) (PAA), the binder being insoluble in a carbonate or ester based solvent. The conductive agent may comprise a carbon powder, and preferably consists of carbon black.

In one embodiment the step of providing the negative electrode comprises the steps of:

providing the micrometric Si based active material, providing the polymeric binder material, providing the conductive agent, and mixing the Si based active material, the polymeric binder material and the conductive agent in a buffered slurry solution at a pH between 2.5 and 3.5, whereby at least part of the surface of the Si based active material is covered by Si—OCO—R groups, Si being part of the active material, and R being the polymeric chain of the binder material, tape casting the slurry on a copper foil, and drying the tape in vacuum.

The buffered slurry solution may comprise citric acid and KOH, and may be at pH 3.

It should be mentioned here that in N. Ding et al., Journal of Power Sources 192 (2009) 644-651, a battery is described having a negative electrode comprising 200 mesh Si particles (D100<75 μm), and an electrolyte which is a solution of 1M LiPF$_6$ in EC/DEC. Contrary to this, the Si powder in this invention has a size distribution with 1 μm<D50<15 μm, and the electrolyte comprises a specific SEI film forming agent such as VC or FEC. Ding further points away from the present invention since he specifically shows that nanometric Si should be used instead of micrometric Si, and states that the addition of VC does not improve or even worsen the performance of the system in combination with Na-CMC. Hence any combination of Ding and another document cannot lead to the present invention.

WO2010/086558 mentions the use of micrometric Si, a conductive agent and a polymeric binder material having carboxyl functional groups. This mixture is mixed in a buffered solution at pH 3. The use of a specific SEI film forming agent is not mentioned. However, the whole document points at using nanometric Si, and the micrometric Si is used only as a reference to show the bad performance of the electrode (Battery A & B), even in combination with Na-CMC and prepared at pH 3. In N-S. Choi et al. in J. Power Sources, 161 (2006) 1254, a silicon thin-film electrode of 200 nm thickness, prepared by E-beam evaporation, and an electrolyte comprising FEC as SEI film forming agent is disclosed. It is known that thin film electrodes do not show the problems of volume variations encountered in composite electrodes prepared with particles. Also thin film electrodes do not use a binder material.

The combination of the teachings of these two documents does not lead to the present invention since the skilled man could not determine which materials to use:

either micrometric Si as in WO'558, or a nanometric film as in Choi or nanometric Si powder as in WO'558, (and WO'558 pointing away from nanometric Si)

a binder having carboxyl functional groups as in WO'558, or no binder as in Choi, no specific SEI film forming agent as in WO'558, or FEC as in Choi, but not for solving the same problem as in WO'558.

DETAILED DESCRIPTION

Figure 1:
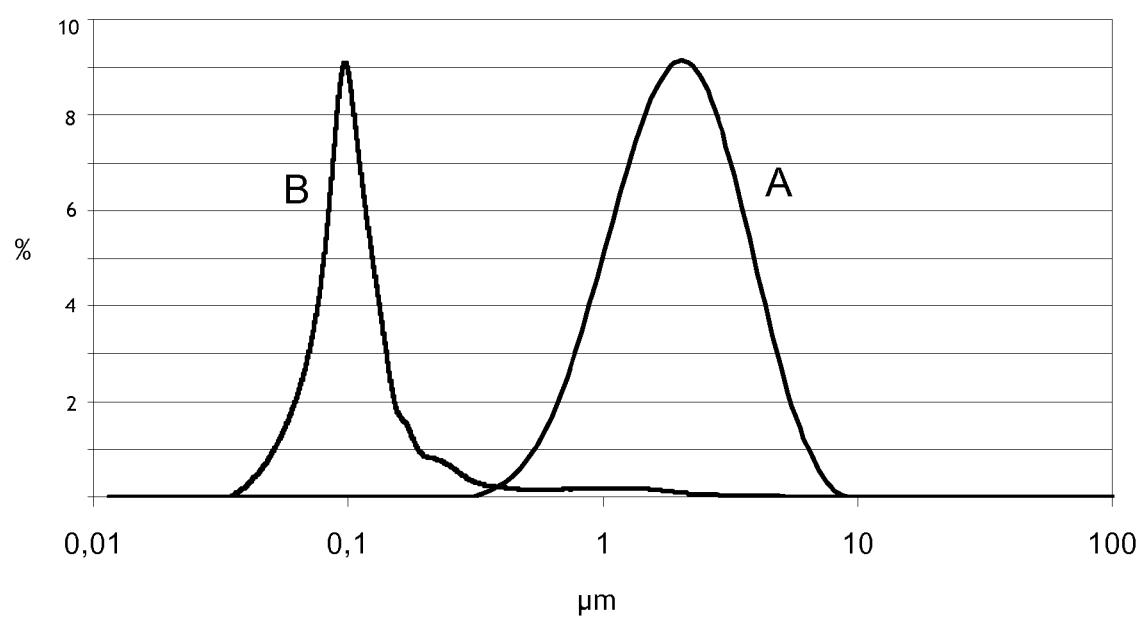
FIG. 1: Particle size distribution (% vs. size in μm) of micrometric silicon (A) and nanometric silicon (B)

As the surface properties of the negative electrode particles determine how they react with the electrolyte, it would be indicated to decrease the silicon surface in contact with the electrolyte, in order to enhance the electrochemical performances of the negative electrode. However, in the past it was not possible to effectively use micrometric Si powders in a negative electrode because of the expansion limitations mentioned before. In a rechargeable battery according to the invention, the approach to solve the problems mentioned above is to combine a micrometric size silicon based powder—as active material in the negative electrode, with a binder that is chemically linked to the silicon powder by a condensation reaction, and with an electrolyte containing SEI film-forming agents, and this combination gives unexpected positive results.

Thus the invention can provide a lithium-ion rechargeable battery comprising a positive electrode, a negative electrode, an electrolyte, a separator and current collectors wherein:
 the electrolyte comprises a SEI film forming agent in order to stabilize the surface of silicon particles with respect to some unfavourable irreversible electrolyte reductions,
 the negative electrode comprises a micrometric Si-based active material, a polymeric binder material and a conductive agent, wherein at least part of the surface of the Si based active material is linked to the binder by the intermediary of a covalent bond. In one embodiment, the micrometric Si based active material has a BET value between 0.1 and 10 m$^2$/g. It can be verified that vinylidene carbonate (VC) has a tendency to polymerize within the electrolyte solution, whereas fluoro ethylene carbonate (FEC), which reacts at the surface of the Si may induce the polymerization of VC onto the surface of the Si resulting in the SEI film formation. Therefore, in one embodiment, the electrolyte comprises both FEC and VC since their stabilization action of the surface of the silicon particles is synergistic. The SEI film forming agents may be added in quantities going from 1 wt % to 15 wt % of the electrolyte mixture.

During the electrode preparation, the micron size silicon based powder (made up of individual particles) is used as active material combined with a conductive agent, such as Super P carbon black (noted CB). Carboxymethyl cellulose (CMC) may be used as polymeric binder. A buffer solution is added to the slurry—which is a mix of Si and CB powders, polymeric binder and water—to modify the slurry pH. Indeed, at low pH, between 2.5 and 3.5, a condensation mechanism between the carboxylic acid groups of the CMC and the silanol SiOH groups present on the surface of silicon is optimized. The presence of silanol Si—OH group is characterized by a negative zeta potential measured in water. During the drying step of the electrode preparation, chemical bonds will be created. Covalent Si-CMC bonding result in up to an order of magnitude larger forces and longer interaction distances between particles and CMC, compared to Si-CMC adsorption reactions that occur at neutral pH. This suggests that an acid pH slurry, and thereby a covalent bonding between CMC and particles, produces much stronger electrode composites.

During the assembly step of the different battery components, in order to assure the ionic conductivity, electrolyte with film-forming additives is added to improve the formation and the behaviour of the SEI during the battery life. These additives allow decreasing the continuous electrolyte degradation which creates a low coulombic efficiency—also defined as a high cumulative irreversibility.

The combination of electrode preparation process control and electrolyte additives allows using cheap micron size silicon based powder with high capacity retention and thus benefits of the lower reactive surface. The following examples illustrate the invention.

Figure 2:
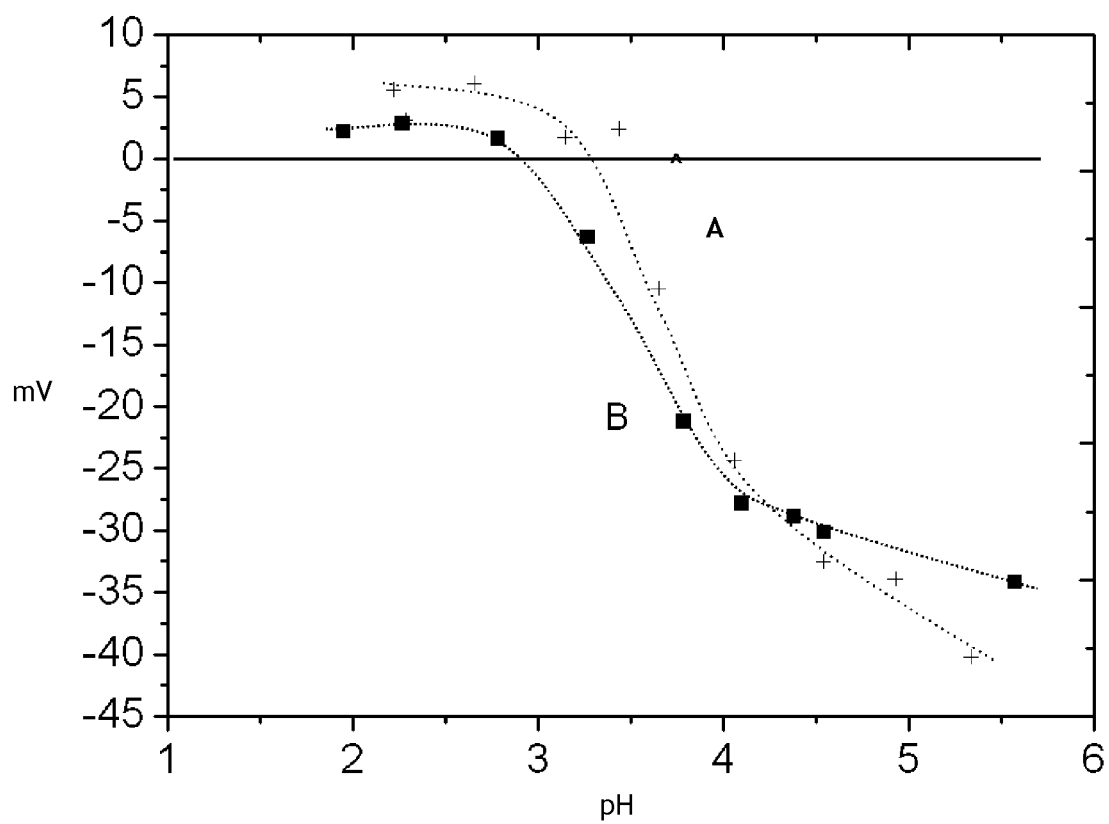
FIG. 2: Zeta potential (mV) versus pH of micrometric silicon (B: ■) and comparison with nano-silicon (A: +)

Example 1: Anode Composed of Micrometric Silicon Chemically Linked to the Polymeric Binder and Electrochemically Tested with Electrolyte Additives In this Example, we use a commercial crystallized Silicon powder from Alfa Aesar, having a BET of 8 m$^2$/g, an oxygen content<4 wt %, a particle size defined as 1 µm<D80<10 µm (FIG. 1—curve A) and an initial negative zeta potential (defined at pH6 in water). The zeta potential becomes positive at a pH lower than 3.5 (FIG. 2—curve A). This silicon has a SiO$_x$ layer (with 0<x<2) having an average thickness between 1 and 3 nm.

The BET surface area is determined on the initial material by nitrogen adsorption at 77 K using an ASAP 2000 instrument from Micrometrics. The particle size distribution is determined on dilute aqueous suspension of the material by low angle laser light scattering using a Beckman Coulter LS 230 laser granulometer. Some fairly big particles are observed by SEM which cannot be detected with the laser granulometer. Zeta potential measurements (determined with a zetasizer nanoseries, Malvern Instrument with an autotitrator MPT-2. The pH was adjusted with HCl 0.25M. Smoluchowski's theory is used to calculate the zeta potential.)

Figure 3:
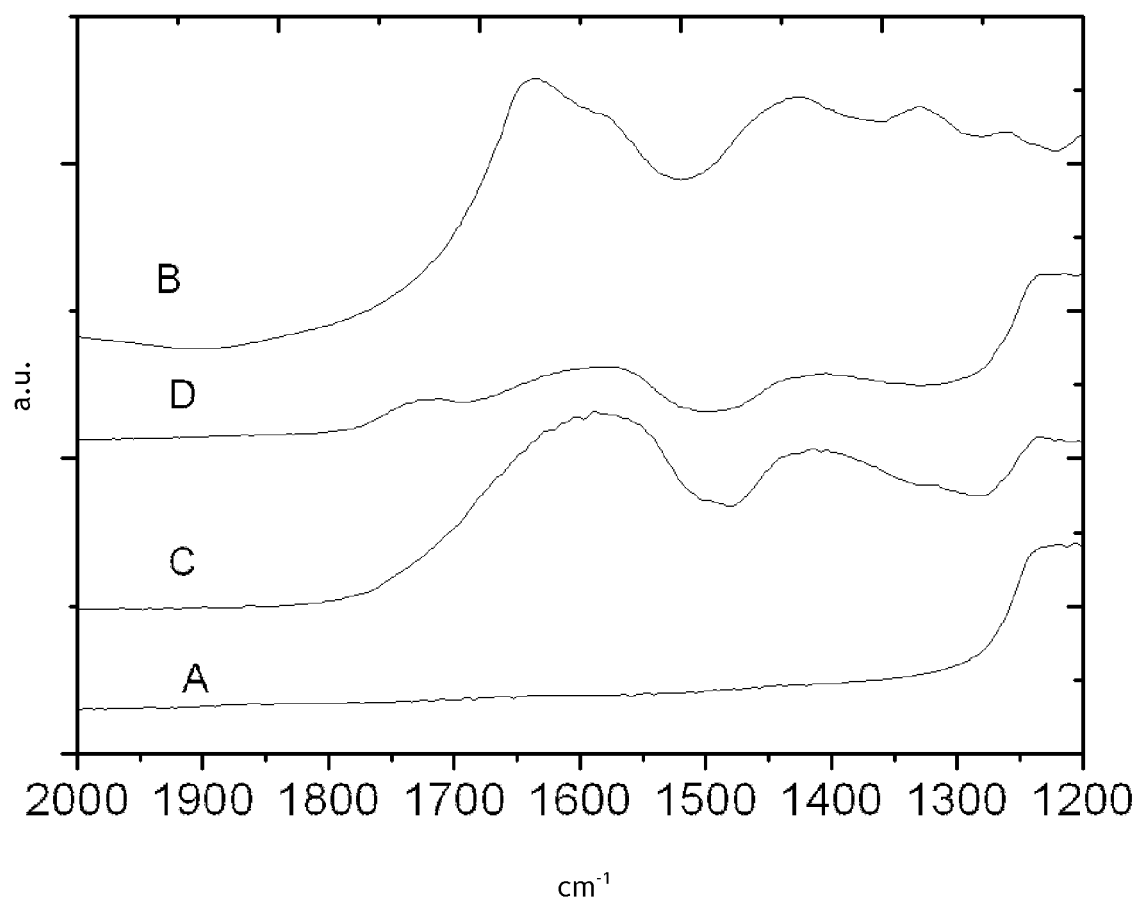
FIG. 3: Diffuse Reflectance Infrared spectroscopy of micrometric silicon (A), pure carboxymethylcellulose (B), micrometric silicon in pH3 solution (C) and Si-CMC composite prepared at pH3 (D); the absorbance is in arbitrary units, the base line of the curves A-D is shifted vertically for reasons of clarity

Electrode Preparation:

Composite electrodes are made of 80 wt % of commercial micrometric silicon, 12 wt % of carbon black and 8 wt % of carboxymethyl cellulose (CMC). 200 mg of composite electrode materials are introduced in a silicon nitride vial with a volume of 12.5 mL. 0.5 mL of pH3 buffer solution, prepared with 3.842 g citric acid and 0.402 g of KOH in 100 mL of deionised water, is added to the composite electrode materials. Three silicon nitride balls of 9.5 mm diameter serve as mixing media. A Fritsch pulverisette 7 mixer is used to mill the slurry at 500 rpm for 60 min. The slurry is tape casted onto a 25 μm thick copper foil, dried for 12 hours at room temperature and then 2 h at 100° C. in vacuum. After this process, it is checked that the polymeric binder is chemically linked to the silicon powder by a condensation reaction. By infrared spectroscopy (using the Diffuse Reflectance collection mode with a vertex 70 Bruker spectrometer, in the medium and near infrared ranges), a carboxylate group peak at 1580 $cm^{-1}$ can be observed in pure CMC (FIG. 3 B). The peaks for the Si-buffer composite (FIG. 3 C) at 1640 $cm^{-1}$ can be assigned to the stretching band of carbonyl group. The emerging peak at 1740 $cm^{-1}$ for the Si-CMC composite prepared at pH3 (FIG. 3 D) is characteristic for an ester like SiOC(O)R group, indicating that CMC has been grafted onto the surface of Si particles. The thickness of the obtained electrode is 10-40 μm, which corresponds to 0.5-2 $mg/cm^2$ of silicon.

Electrochemical Testing:

Electrochemical cells (Swagelok-type) are used for the electrochemical tests, assembled in an argon filled glove box and cycled using a VMP automatic cycling data recording system (Biologic Co.) operating in galvanostatic mode between 1 and 0.005V versus Li+/Li°. These cells comprise a 1 $cm^2$ disc of composite positive electrode. A whatman GF/D borosilicate glass-fibre sheet is used as separator, saturated with a 1M $LiPF_6$ electrolyte solution in 1/1 diethyl carbonate/ethylene carbonate (solvents). As film-forming agents, 10 wt % of fluoro ethylene carbonate (FEC) and 2 wt % of vinylene carbonate are added to this $LiPF_6$-comprising electrolyte ($LiPF_6$+DEC+EC+FEC+VC=100 wt %). A 1 $cm^2$ Li metal disc is used as negative and reference electrode. The cells are cycled at a rate of one lithium in two hours (C/2) both in discharge (alloying) and charge (dealloying).

Figure 4:
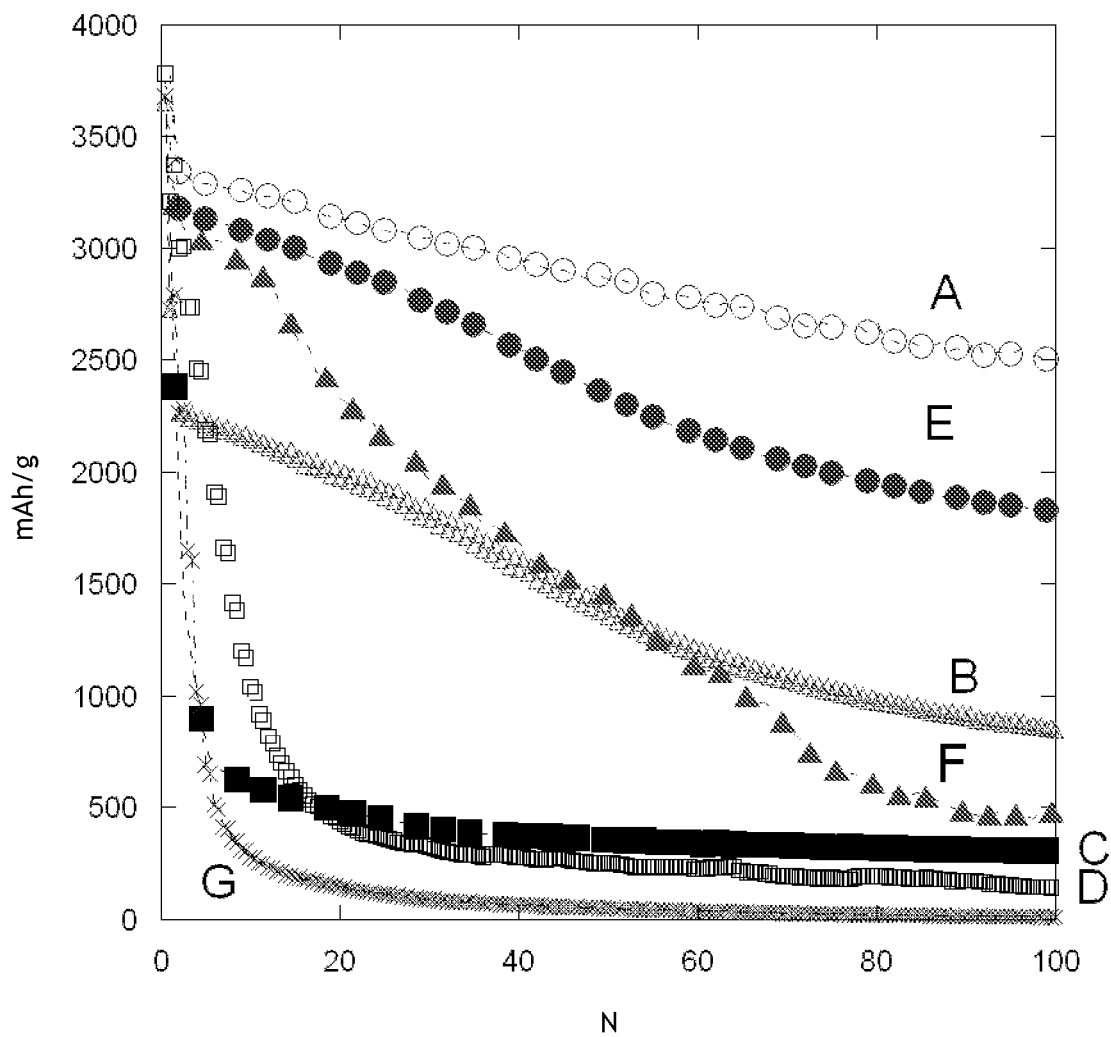
FIG. 4: Lithiation and delithiation capacity (in mAh/g of active material) versus number of cycles N for a battery using the negative electrode of Example 1 (curve A), Counter Example 1 (curve B), Counter Example 2 (curve C), Counter Example 3 (curve D), Counter Example 4 (curve E), Counter Example 5 (curve F), and Counter Example 6 (curve G)

In FIG. 4, curve A (○) shows the specific discharge capacity (mAh per g of active material, defined here as mAh per g of silicon), versus the number of cycles for Example 1.

Example 1.1: Electrodes Made with Other Buffer Solution

Electrodes can be made as in Example 1 with different known buffer solutions. The organic acid may be selected within the following list: 2-(4-hydroxyphenyl)amino acetic acid, aspartic acid, bromo acetic acid, bromo benzoic acid, chloro acetic acid, dichloro acetic acid, trichloro acetic acid, lactic acid, maleic acid, malonic acid, oxalic acid, phtalic acid, isophthalic acid, terephthalic acid, picric acid, fumaric acid, salicylic acid.

Counter-Example 1: Anode Composed of Micrometric Silicon Chemically Linked to the Polymeric Binder and Electrochemically Tested without Electrolyte Additives The electrode preparation is the same as in Example 1. The electrochemical testing is the same as Example 1 except that neither fluoro ethylene carbonate (FEC) nor vinylene carbonate is added to the electrolyte. In FIG. 4, curve B (△) gives the specific discharge capacity (mAh/g_silicon) versus the number of cycles for Counter-Example 1.

Counter-Example 2: Anode Composed of Micrometric Silicon not Chemically Linked to the Polymeric Binder and Electrochemically Tested with Electrolyte Additives The electrode preparation is the same as in Example 1 except that in the slurry preparation 0.5 mL of deionized water is used (pH 7) instead of 0.5 mL of pH3 buffer solution. The electrochemical testing is the same as in Example 1. In FIG. 4, curve C (■) shows the specific discharge capacity (mAh/g_silicon) versus the number of cycles for Counter-Example 2.

Counter-Example 3: Anode Composed of Micrometric Silicon not Chemically Linked to the Polymeric Binder and Electrochemically Tested without Electrolyte Additives The electrode preparation is the same as in Example 1 except that in the slurry preparation 0.5 mL of deionized water is used (pH 7) instead of 0.5 mL of pH3 buffer solution. The electrochemical testing is the same as Example 1 except that neither fluoro ethylene carbonate (FEC) nor vinylene carbonate is added to the electrolyte. In FIG. 4, curve D (□) shows the specific discharge capacity (mAh/g_silicon) versus the number of cycle for Counter-Example 3.

Counter-Example 4: Anode Composed of Nanometric Silicon Chemically Linked to the Polymeric Binder and Electrochemically Tested with Electrolyte Additives In this example, a crystallized Silicon powder having a BET of 57 $m^2/g$, an oxygen content<4 wt %, a particle size defined as 50 nm<D80<200 nm (FIG. 1 B) and an initial negative zeta potential (defined at pH7 in water) is used (the zeta potential becomes positive at a pH lower than 3.5) (FIG. 2 B).

The electrode preparation is the same as in Example 1 except that nanometric silicon is used instead of micrometric silicon. It can be verified that the same type of chemical bonds with the polymeric binder are realized as described for the micrometric silicon. The electrochemical testing is the same as in Example 1. In FIG. 4, curve E (●) gives the specific discharge capacity (mAh/g_silicon) versus the number of cycles for Counter-Example 4.

Counter-Example 5: Anode Composed of Nanometric Silicon Chemically Linked to the Polymeric Binder and Electrochemically Tested without Electrolyte Additives The electrode preparation is the same as in Example 1 except that nanometric silicon is used instead of micrometric silicon. The electrochemical testing is the same as Example 1 except that neither fluoro ethylene carbonate (FEC) nor vinylene carbonate is added to the electrolyte. In FIG. 4, curve F (▲) gives the specific discharge capacity (mAh per g of silicon) versus the number of cycles for Counter-Example 5.

Counter-Example 6: Anode Composed of Nanometric Silicon not Chemically Linked to the Polymeric Binder and Electrochemically Tested with Electrolyte Additives The electrode preparation is the same as in Example 1 except that (i) nanometric silicon is used instead of micrometric silicon, and (ii) in the slurry preparation 0.5 mL of deionized water is used (pH 7) instead of 0.5 mL of pH3 buffer solution. The electrochemical testing is the same as in Example 1. In FIG. 4, curve G (x) gives the specific discharge capacity (mAh per g of silicon) versus the number of cycles for Counter-Example 6.

Conclusion of Example 1 and CE 1 to 6: the composite electrode prepared with micrometric Si using the pH3 process, and FEC/VC additives in the electrolyte shows the best performance (highest capacity after 100 cycles) compared to all Counter-Examples 1 to 6 that do not combine the same synergistic elements of the invention.

Figure 5:
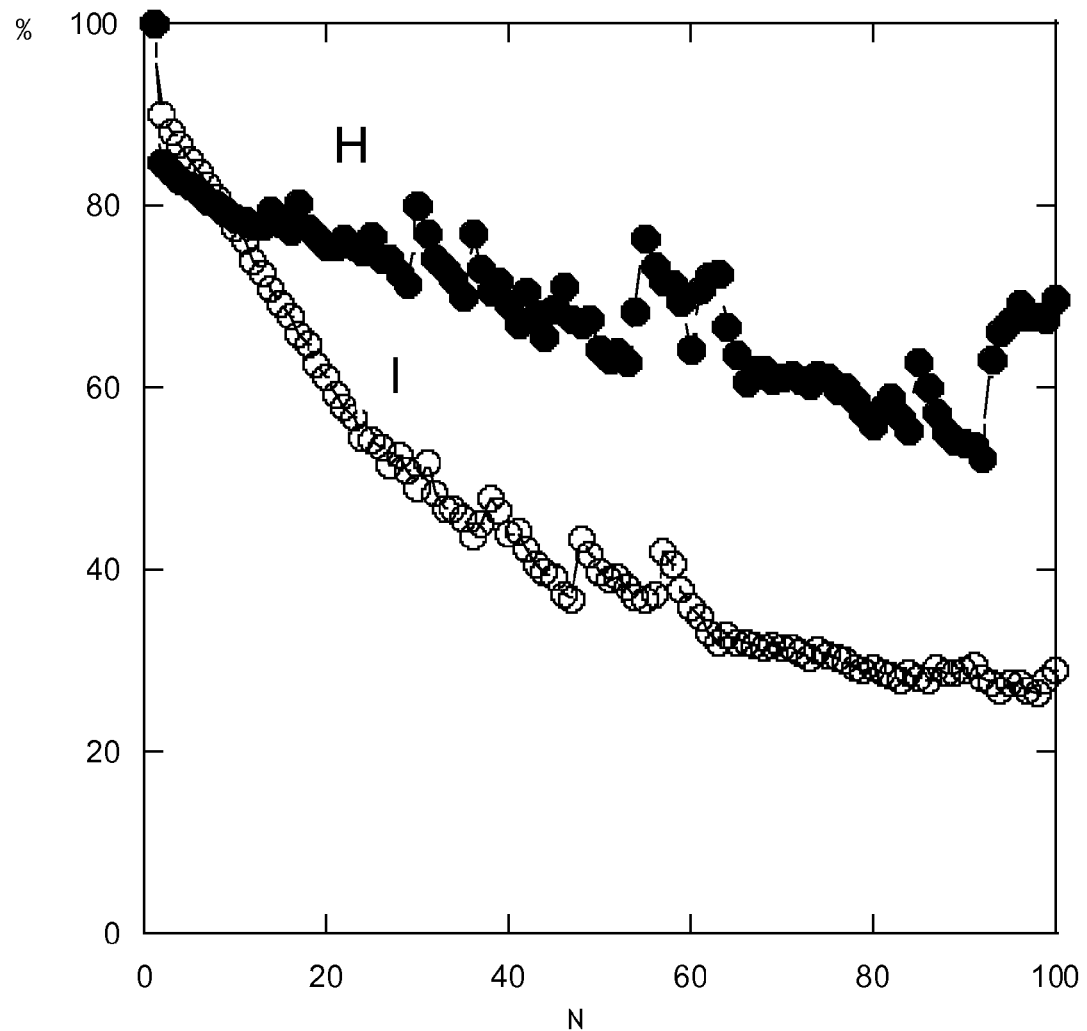
FIG. 5: Capacity retention (in %) versus number of cycles N for a battery using the negative electrode of Example 2 (curve H) and Counter Example 7 (curve I)

Example 2: Anode Composed of Micrometric Silicon Chemically Linked to the Polymeric Binder—with a Different Silicon/Binder Ratio—and Electrochemically Tested with Electrolyte Additives The electrode preparation is the same as in Example 1 except that the composite electrode is made of 50 wt % of commercial micrometric silicon, 25 wt % of carbon black and 25 wt % of carboxymethyl cellulose. The electrochemical testing is the same as Example 1. In FIG. 5, curve H (●) gives the specific discharge capacity (mAh per g of silicon) versus the number of cycles for Example 2.

Counter-Example 7: Anode Composed of Micrometric Silicon not Chemically Linked to the Polymeric Binder with the Silicon/Binder Ratio of Ex. 2 and Electrochemically Tested with Electrolyte Additives The electrode preparation is the same as Example 2 except that in the slurry preparation 0.5 mL of deionized water is used (pH 7) instead of 0.5 mL of pH3 buffer solution. The electrochemical testing is the same as in Example 2. In FIG. 5, curve I (○) gives the specific discharge capacity (mAh per g of silicon) versus the number of cycles for Counter-Example 7.

Conclusion of Example 2 and CE 7: the composite electrode prepared with micrometric Si using the pH3 process, and FEC/VC additives in the electrolyte shows a better performance compared to Counter-Example 7.

Figure 6:
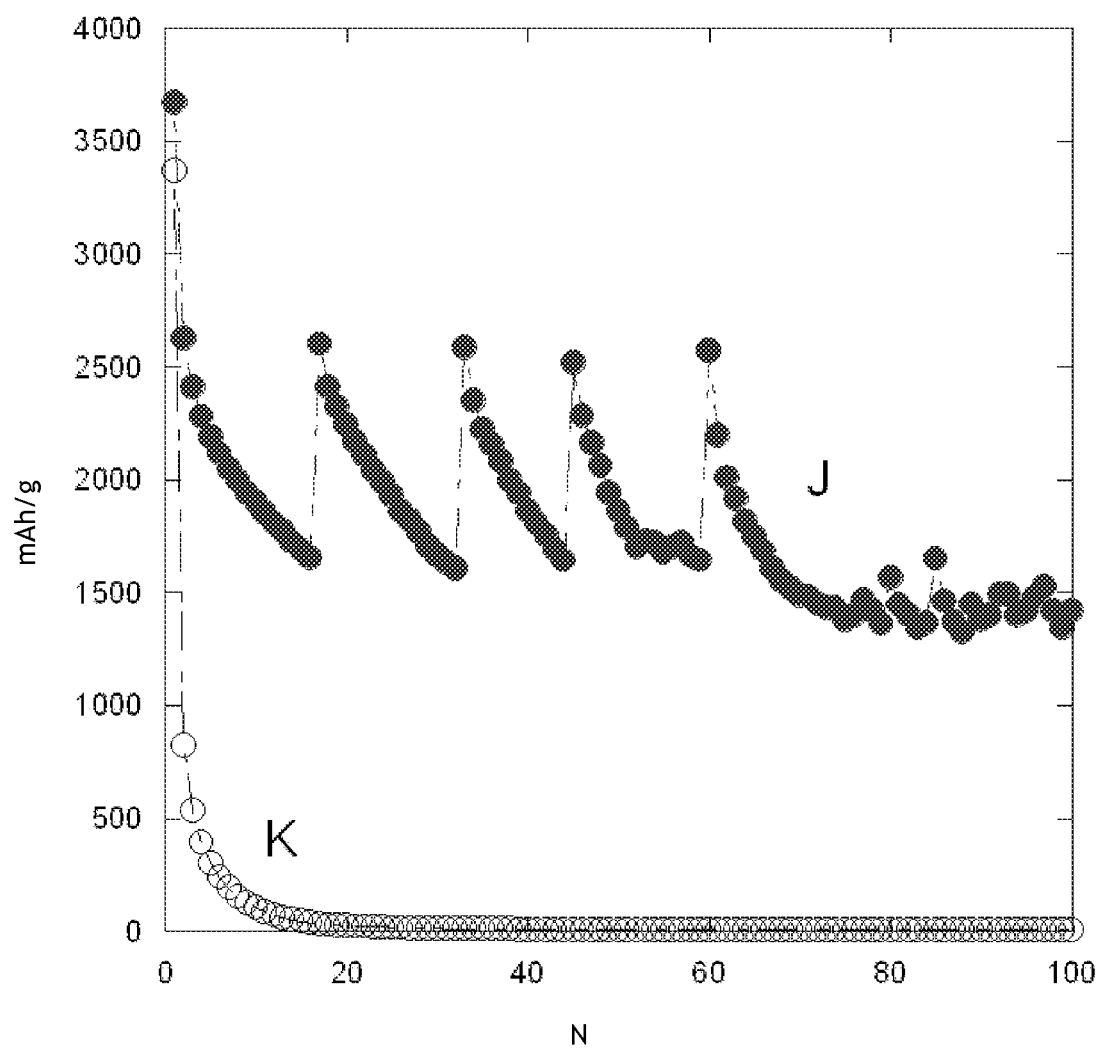
FIG. 6: Lithiation and delithiation capacity (in mAh/g of active material) versus number of cycles for a battery using the negative electrode of Example 3 (curve J) and Counter Example 8 (curve K)

Example 3: Anode Composed of Micrometric Silicon Chemically Linked to the Polymeric Binder—with a Different Silicon/Binder Ratio—and Electrochemically Tested with Electrolyte Additives The electrode preparation is the same as in Example 1 except that the composite electrode is made of 90 wt % of commercial micrometric silicon, 5 wt % of carbon black and 5 wt % of carboxymethyl cellulose. The electrochemical testing is the same as in Example 1. In FIG. 6, curve J (●) gives the specific discharge capacity (mAh per g of silicon) versus the number of cycles for Example 3. Note that the capacity jumps observed in the J curves are due to measurement artifacts which should disappear after electrode processing and battery optimizations.

Counter-Example 8: Anode Composed of Micrometric Silicon not Chemically Linked to the Polymeric Binder with the Silicon/Binder Ratio of Ex. 3 and Electrochemically Tested with Electrolyte Additives The electrode preparation is the same as Example 3 except that in the slurry preparation 0.5 mL of deionized water is used (pH 7) instead of 0.5 mL of pH3 buffer solution. The electrochemical testing is the same as Example 3. In FIG. 6, curve K (○) gives the specific discharge capacity (mAh per g of silicon) versus the number of cycles for Counter-Example 8.

Conclusion of Example 3 and C-E 8: the composite electrode prepared with micrometric Si using the pH3 process, and FEC/VC additives in the electrolyte shows a better performance compared to Counter-Example 8.

Further conclusion of Examples 1, 2 and 3 relating to the different silicon/binder ratios: these examples show that whatever the amount of micrometric silicon in the electrode, the formulation at pH3 and the presence of electrolyte additives increase the electrode performance. In the case of electrodes with only silicon powder as active material (the active material of Ex. 1-3), optimum performances are obtained for formulations with around 80 wt % silicon.

Figure 7:
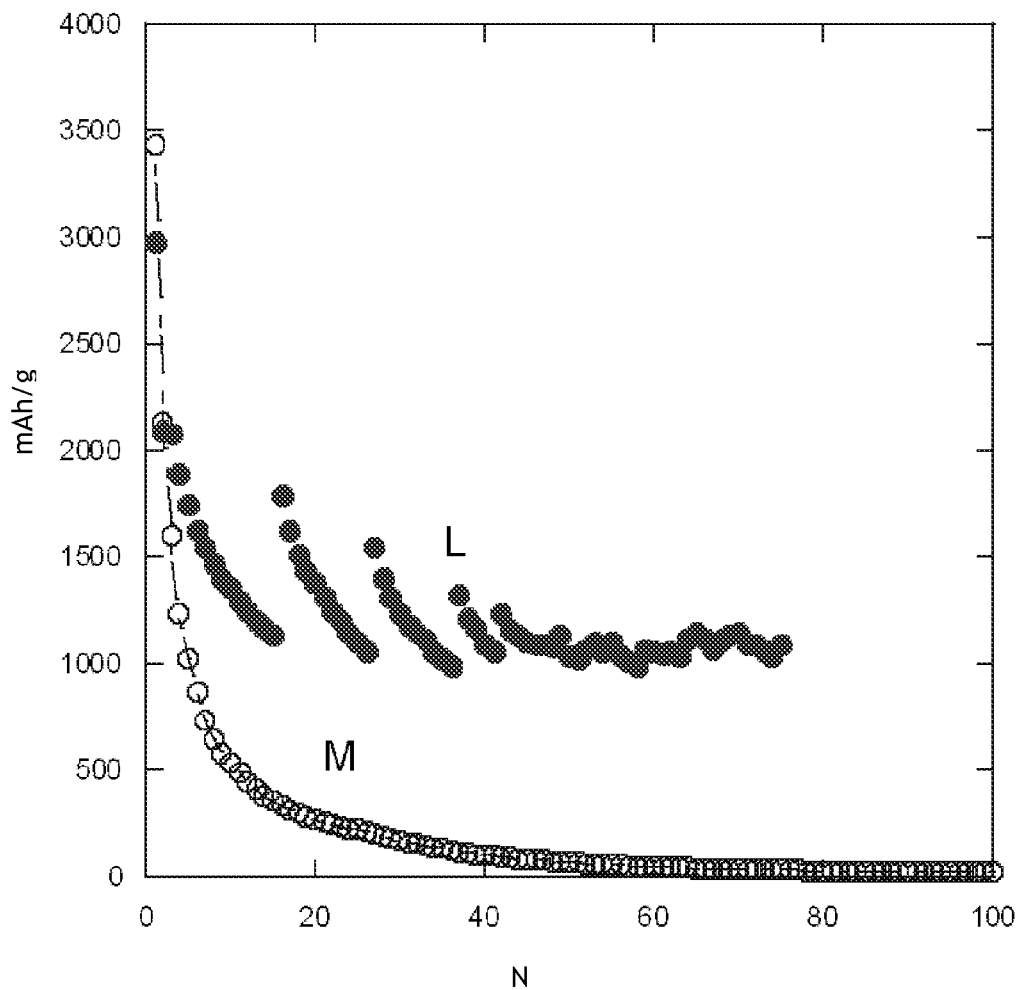
FIG. 7: Lithiation and delithiation capacity (in mAh/g of active material) versus number of cycles N for a battery using the negative electrode of Example 4 (curve L) and Counter Example 9 (curve M)

Example 4: Anode Composed of Micrometric Silicon Chemically Linked to Another Polymeric Binder and Electrochemically Tested with Electrolyte Additives The electrode preparation is the same as in Example 1 except that poly (acrylic acid) (PAA) is used instead of carboxymethyl cellulose (CMC). The electrochemical testing is the same as in Example 1. In FIG. 7, curve L (●) gives the specific discharge capacity (mAh per g of silicon) versus the number of cycles for Example 4.

As the CMC, PAA has carboxylic groups that can link with the surface of silicon particles. Thus, apart from the mechanical aspects (elasticity and viscosity of the solution) that can provide the CMC complex molecules, the PAA is as effective as the CMC.

Counter-Example 9: Anode Composed of Micrometric Silicon Chemically Linked to Another Polymeric Binder and Electrochemically Tested without Electrolyte Additives The electrode formulation is the same as in Example 4. The electrochemical testing is the same as Example 1 except that neither fluoro ethylene carbonate (FEC) nor vinylene carbonate is added to the electrolyte. In FIG. 7, curve M (○) gives the specific discharge capacity (mAh per g of silicon) versus the number of cycles for Counter-Example 9.

Conclusion of Example 4 and CE 9: the composite electrode prepared with micrometric Si using the pH3 process, and FEC/VC additives in the electrolyte shows a better performance (higher capacity after 80 cycles) compared to Counter-Example 9.

Example 5: Anode Composed of Micrometric Silicon Monoxide Chemically Linked to the Polymeric Binder and Electrochemically Tested with Electrolyte Additives A micrometric SiO powder is provided by American Element, having a BET of 4 $m^2/g$ and an oxygen content of 37 wt %. The X-ray diffraction shows that this silicon monoxide is almost amorphous. The zeta potential (defined at pH7 in water) of this powder is negative at pH7 and positive for pH lower than 4.

A slurry is prepared using 50 wt % of this powder, 25 wt % of a Na-CMC binder (Molecular weight<200 000) and 25 wt % of a conductive additive (Super C65, commercial product from Timcal). In a first step, a 2.4 wt % Na-CMC solution is prepared and dissolved overnight in an aqueous solution of citric acid (0.171 mol/L) and KOH (0.071 mol/L). Then, the conductive carbon is added to this solution and stirred for 20 minutes using a high-shear mixer. Once a good dispersion of the conductive carbon is obtained, the active material is added and the slurry is stirred again using a high-shear mixer during 30 minutes. After this process, it was proved that the polymeric binder is chemically linked to the silicon powder by a condensation reaction.

Figure 8:
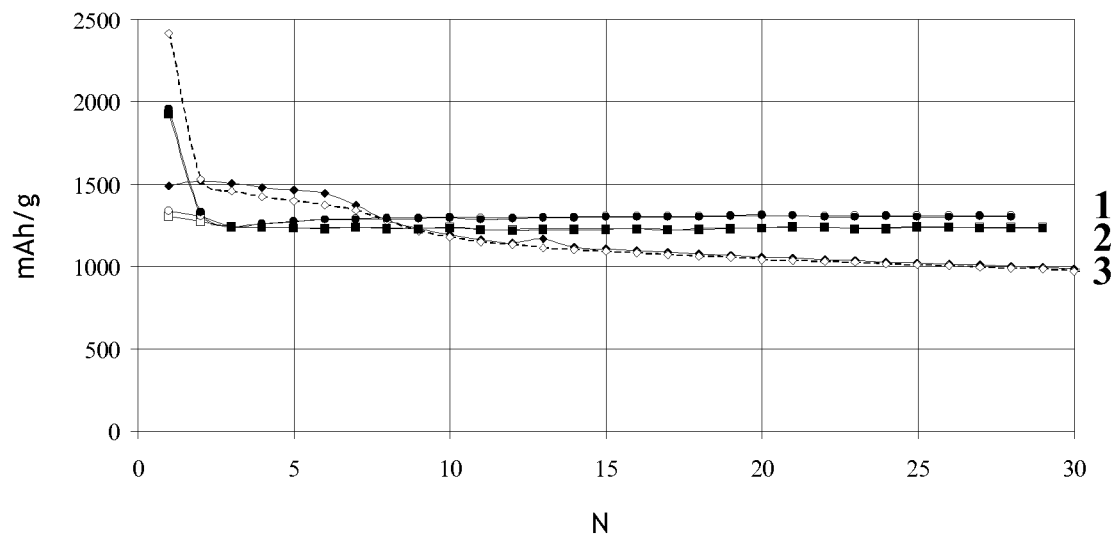
FIG. 8: Lithiation and delithiation capacity (in mAh/g of active material) versus number of cycles N for a battery using the negative electrodes of Example 6 (curve 1), Counter Example 10 (curve 2) and Counter Example 11 (curve 3)

Electrodes are prepared by coating the resulting slurry on a copper foil (thickness: 17 μm) with a slurry layer thickness of 125 μm and then drying at 70° C. for 2 hours. Round electrodes are punched and dried at 150° C. during 3 hours in a small vacuum oven. The thickness of the obtain electrode is 10-20 μm which correspond to 1-2 $mg/cm^2$ of silicon. The electrodes are electrochemically tested versus metallic lithium in coin cells prepared in a glove box under dry argon atmosphere. The electrolyte used is 1M $LiPF_6$ in a mix of ethylene carbonate (EC)/diethyl carbonate (DEC) (50/50 wt %), 10 wt % fluoro ethylene carbonate (FEC)+2 wt % vinylene carbonate (VC) (commercial product of Semichem). The coin cells are tested in a continuous current (CC) mode between 10 mV and 1.5 V at a rate of C/5 (meaning a full charge or discharge of 1870 mAh/g of active material in 5 hours). The result is shown in FIG. 8, curve 1 showing the capacity retention in mAh/g of active material versus cycle number N. The capacity is maintained for at least 30 cycles at 1300 mAh/g.

Counter-Example 10: Anode Composed of Micrometric Silicon Monoxide Chemically Linked to the Polymeric Binder and Electrochemically Tested without Electrolyte Additives In this Example, an electrode is prepared with SiO as active material, as in Example 5. The electrodes are electrochemically tested versus metallic lithium in coin cells (as in Ex. 5) but the electrolyte used is 1M LiPF$_6$ in a mix of ethylene carbone (EC)/diethyl carbonate (DEC) (50/50 wt %)(commercial product of Semichem). The main difference is that this electrolyte does not contain specific film-forming additives. The result is shown in FIG. 8, curve 2 showing the capacity retention in mAh/g of the active material versus cycle number N. The capacity is maintained for at least 30 cycles at 1250 mAh/g (=lower than Ex 5).

Counter-Example 11: Anode Composed of Micrometric Silicon Monoxide not Chemically Linked to the Polymeric Binder and Electrochemically Tested with Electrolyte Additives In this Example, an electrode is prepared (as in Ex 5) with SiO as active material but without pH control during the slurry mixing. So in a first step, a 2.4 wt % Na-CMC solution is prepared and dissolved overnight in pure water; then conductive carbon and active material are added and mixed as described previously. After this process, it was found that the polymeric binder is not chemically linked to the silicon powder.

The electrodes are electrochemically tested versus metallic lithium in coin cells (as in Ex 5) with electrolyte used is 1M LiPF$_6$ in a mix of ethylene carbone (EC)/diethyl carbonate (DEC) (50/50 wt %) 10 wt % fluoro ethylene carbonate (FEC)+2 wt % vinylene carbonate (VC) (commercial product of Semichem). The result is shown in FIG. 8, curve 3. The capacity decreases rapidly and reaches only 1000 mAh/g after 30 cycles.

Conclusion of Example 5 and CE 10-11: the composite electrode prepared with micrometric SiO using the pH3 process, and FEC/VC additives in the electrolyte shows a better performance compared to Counter-Example 10-11.

Example 6: Anode Composed of a Mixture of Graphite and Micrometric Silicon Chemically Linked to the Polymeric Binder and Electrochemically Tested with Electrolyte Additives A commercial graphite powder is provided, having a BET of 4.5 m$^2$/g. A slurry is prepared using 63 wt % of this graphite powder, 12 wt % of micrometric silicon (the active material used in Ex 1), 15 wt % of a Na-CMC binder (Molecular weight<200 000) and 10 wt % of a conductive additive (Super C65, commercial product from Timcal). In a first step, a 2.4 wt % Na-CMC solution is prepared and dissolved overnight in an aqueous solution of citric acid (0.171 mol/L) and KOH (0.071 mol/L). Then, the conductive carbon is added to this solution and stirred for 20 minutes using a high-shear mixer. Once a good dispersion of the conductive carbon is obtained, the active material (simple mix of graphite and silicon) is added and the slurry is stirred again using a high-shear mixer during 30 minutes. After this process, it can be verified that the polymeric binder is chemically linked to the silicon powder by a condensation reaction.

Figure 9:
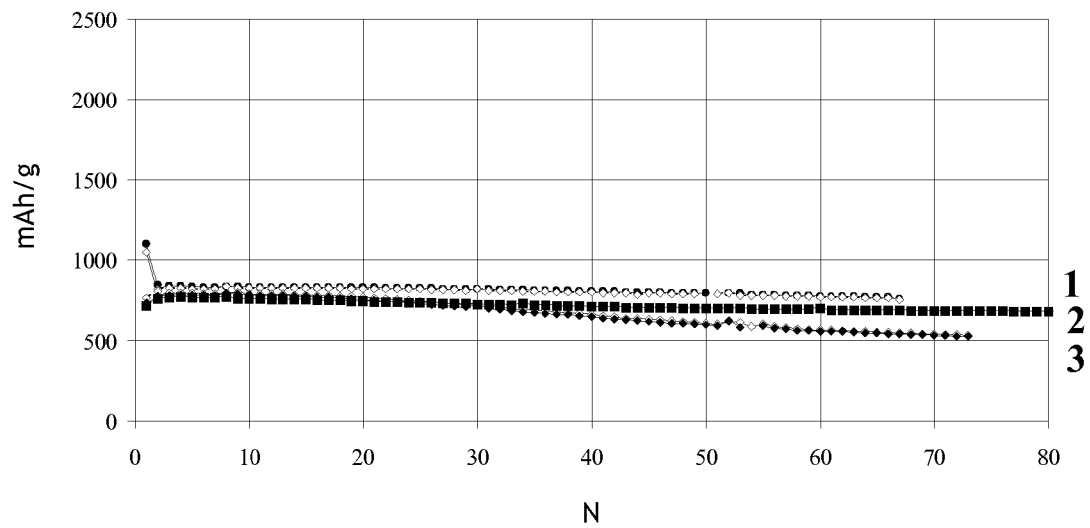
FIG. 9: Lithiation and delithiation capacity (in mAh/g of active material) versus number of cycles N for a battery using the negative electrodes of Example 7 (curve 1), Counter Example 12 (curve 2) and Counter Example 13 (curve 3)

Electrodes are prepared by coating the resulting slurry on a copper foil (thickness: 17 μm) with a slurry layer thickness of 125 μm and then drying at 70° C. for 2 hours. Round electrodes are punched and dried at 150° C. during 3 hours in a small vacuum oven. The electrodes are electrochemically tested versus metallic lithium in coin cells prepared in a glove box under dry argon atmosphere. The electrolyte used is 1M LiPF$_6$ in a mix of ethylene carbone (EC)/diethyl carbonate (DEC) (50/50 wt %), 10 wt % fluoro ethylene carbonate (FEC)+2 wt % vinylene carbonate (VC) (commercial product of Semichem). The coin cells are tested in a continuous current (CC) mode between 10 mV and 1.5 V at a rate of C/5 (meaning a full charge or discharge of 1870 mAh/g of active material in 5 hours). The result is shown in FIG. 9, curve 1 showing the capacity retention in mAh/g of active material versus cycle number N. The capacity is maintained for at least 70 cycles at 800 mAh/g.

Counter-Example 12: Anode Composed of a Mixture of Graphite and Micrometric Silicon Chemically Linked to the Polymeric Binder and Electrochemically Tested without Electrolyte Additives In this Example, an electrode is prepared as the previous Ex 6 with graphite and silicon as active materials. The electrodes are electrochemically tested versus metallic lithium in coin cells but the electrolyte used is 1M LiPF$_6$ in a mix of ethylene carbone (EC)/diethyl carbonate (DEC) (50/50 wt %)(commercial product of Semichem). The main difference is that this electrolyte does not contain specific film-forming additives. The result is shown in FIG. 9, curve 2 showing the capacity retention in mAh/g of active material versus cycle number N. The capacity is maintained for at least 70 cycles at 750 mAh/g (=lower than Ex 6).

Counter-Example 13: Anode Composed of a Mixture of Graphite and Micrometric Silicon not Chemically Linked to the Polymeric Binder and Electrochemically Tested with Electrolyte Additives In this Example, an electrode is prepared as in Ex 6 with graphite and Silicon as active materials, but without pH control during the slurry mixing. In a first step, a 2.4 wt % Na-CMC solution is prepared and dissolved overnight in pure water; then conductive carbon and active material are added and mixed as described previously. After this process, it was found that the polymeric binder is not chemically linked to the silicon powder. The electrodes are electrochemically tested versus metallic lithium in coin cells as in the previous example, with an electrolyte being 1M LiPF$_6$ in a mix of ethylene carbone (EC)/diethyl carbonate (DEC) (50/50 wt %) 10 wt % fluoro ethylene carbonate (FEC)+2 wt % vinylene carbonate (VC) (commercial product of Semichem). The result is shown in FIG. 9, curve 3. The capacity decreases continuously and reaches only 500 mAh/g after 50 cycles.

Conclusion of Example 6 and CE 12-13: the composite electrode prepared with micrometric Si and graphite using the pH3 process and FEC/VC additives in the electrolyte shows a better performance compared to Counter-Example 12 and 13. The small difference between these 3 batteries can be explained by the diminution of silicon surface.

Example 7: Anode Composed of Micrometric Modified Silicon Monoxide Chemically Linked to the Polymeric Binder and Electrochemically Tested with Electrolyte Additives A metal oxide (SiO—MgO) mixture is prepared by mixing 80 wt % of the commercial SiO with 20 wt % of MgO (commercial product from Aldrich) in a planetary mixer during 1 hour (with 650 rotations per minutes, weight ratio ball/powder:20/1). The oxygen ratio of the final powder is 37 wt %, and the particles stay micrometric (between 1 and 15 μm). A slurry is prepared using 80 wt % of this powder, 10 wt % of a Na-CMC binder (Molecular weight<200 000) and 10 wt % of a conductive additive (Super C65, commercial product from Timcal). In a first step, a 2.4% Na-CMC solution is prepared and dissolved overnight. Then, the conductive carbon is added to this solution and stirred for 20 minutes using a high-shear mixer. Once a good dispersion of the conductive carbon is obtained, the active material is added and the slurry is stirred again using a high-shear mixer during 30 minutes.

Electrodes are prepared by coating the resulting slurry on a copper foil (thickness: 17 μm) with a slurry layer thickness of 125 μm and then dried at 70° C. for 2 hours. Round electrodes are punched and dried at 150° C. during 3 hours in a small vacuum oven. The electrodes are electrochemically tested versus metallic lithium in coin cells prepared in a glove box under dry argon atmosphere. The electrolyte used is 1M LiPF$_6$ in a mix of ethylene carbone (EC)/diethylcarbonate (DEC) (50/50 wt %)+10% fluoroethylcarbonate (FEC)+2% vinylene carbonate (VC) (commercial product of Semichem). The electrochemical performance shows a stable capacity of 850 mAh/g during at least 100 cycles.

Counter-Example 14: Anode Composed of Micrometric Modified Silicon Monoxide Chemically not Linked to the Polymeric Binder and Electrochemically Tested with Electrolyte Additives In this Example, an electrode is prepared as in the previous example with modified silicon monoxide as active materials, but without pH control during the slurry mixing. In a first step, a 2.4 wt % Na-CMC solution is prepared and dissolved overnight in pure water; then conductive carbon and active material are added and mixed as described previously. After this process, it was found that the polymeric binder is not chemically linked to the silicon powder. The electrodes are electrochemically tested versus metallic lithium in coin cells as in the previous example, with an electrolyte being 1M LiPF$_6$ in a mix of ethylene carbone (EC)/diethyl carbonate (DEC) (50/50 wt %) 10 wt % fluoro ethylene carbonate (FEC)+2 wt % vinylene carbonate (VC) (commercial product of Semichem). The electrochemical characterization show a capacity of 850 mAh/g during the first ten cycles (as in the previous example) but then the capacity decreases continuously and reaches only 720 mAh/g after 100 cycles.

Example 8: Anode Composed of a Mix of Micrometric Silicon and Nanometric Silicon Chemically Linked to the Polymeric Binder and Electrochemically Tested with Electrolyte Additives A nanometric silicon powder is provided, having a BET of 20 m$^2$/g and a particle size distribution with 50 nm<D80<200 nm. A slurry is prepared using 40 wt % of this nanometric powder, 40 wt % of micrometric silicon (the active material used in Ex 1), 14 wt % of a Na-CMC binder (Molecular weight<200 000) and 6 wt % of a conductive additive (Super C65, commercial product from Timcal). In a first step, a 2.4 wt % Na-CMC solution is prepared and dissolved overnight in an aqueous solution of citric acid (0.171 mol/L) and KOH (0.071 mol/L). Then, the conductive carbon is added to this solution and stirred for 20 minutes using a high-shear mixer. Once a good dispersion of the conductive carbon is obtained, the active material (simple mix of graphite and silicon) is added and the slurry is stirred again using a high-shear mixer during 30 minutes. After this process, it can be verified that the polymeric binder is chemically linked to the silicon powder by a condensation reaction.

Electrodes are prepared by coating the resulting slurry on a copper foil (thickness: 17 μm) with a slurry layer thickness of 125 μm and then drying at 70° C. for 2 hours. Round electrodes are punched and dried at 150° C. during 3 hours in a small vacuum oven. The electrodes are electrochemically tested versus metallic lithium in coin cells prepared in a glove box under dry argon atmosphere. The electrolyte used is 1M LiPF$_6$ in a mix of ethylene carbone (EC)/diethyl carbonate (DEC) (50/50 wt %), 10 wt % fluoro ethylene carbonate (FEC)+2 wt % vinylene carbonate (VC) (commercial product of Semichem). The coin cells are tested in a continuous current (CC) mode between 10 mV and 1.5 V at a rate of C/5 (meaning a full charge or discharge of 1870 mAh/g of active material in 5 hours). The battery delivers an initial capacity of 3400 mAh/g but this capacity drops continuously like in Example 1. The capacity after 100 cycles is 2200 mAh/g. This result is better than Counter-Example 4 (electrode made with only nanometric silicon). The difference can be explained by the presence of micrometric silicon, which decreases the BET value.

Counter-Example 15: Anode Composed of a Mix of Micrometric Silicon and Nanometric Silicon not Chemically Linked to the Polymeric Binder and Electrochemically Tested with Electrolyte Additives In this Example, an electrode is prepared as in Ex 8 with micrometric and nanometric silicon as active materials, but without pH control during the slurry mixing. In a first step, a 2.4 wt % Na-CMC solution is prepared and dissolved overnight in pure water; then conductive carbon and active material are added and mixed as described previously. After this process, it was found that the polymeric binder is not chemically linked to the silicon powder. The electrodes are electrochemically tested versus metallic lithium in coin cells as in the previous example, with an electrolyte being 1M LiPF$_6$ in a mix of ethylene carbone (EC)/diethyl carbonate (DEC) (50/50 wt %) 10 wt % fluoro ethylene carbonate (FEC)+2 wt % vinylene carbonate (VC) (commercial product of Semichem). The result shows a high initial capacity (3500 mAh/g) which proves that all the silicon is connected and working. But the capacity drops continuously and fast to reach only 1200 mAh/g after 100 cycles.

The invention claimed is:

1. A process for preparing a rechargeable battery comprising a positive electrode, a negative electrode and an electrolyte, comprising:
   providing a battery container, a current collector and a separator,
   providing a positive electrode,
   providing an electrolyte comprising an SEI-film forming agent, wherein the SEI film-forming agent is selected from one or more of the group consisting of fluoro ethylene carbonate, vinylidene carbonate, vinyl ethylene carbonate, phenyl ethylene carbonate, phenylvinylene carbonate, catechol carbonate, allyl methyl carbonate, allyl ethyl carbonate, vinyl acetate, acrylonitrile and 2-cyanofuran,
   providing a negative electrode comprising a micrometric Si based active material having a particle size distribution with 1 μm<D50<15 μm and with 1 μm<D80<15 μm, a polymeric binder material having carboxyl functional groups and a conductive agent, wherein at least part of a surface of the Si based active material comprises a Si—OCO—R group, Si being part of the active material, and R being a polymeric chain of the binder material, and
   assembling the current collector, the separator, the electrolyte, the positive electrode and the negative electrode in the battery container to prepare the rechargeable battery.

2. The process according to claim 1, wherein the polymeric binder material comprises a compound with carboxyl functional groups and is insoluble in a carbonate or ester based solvent.

3. The process according to claim 1, wherein the Si based active material comprises one or more of the following:
   pure Si,
   silicon having a SiO$_x$ surface layer, with 0<x<2, the surface layer having an average thickness between 0.5 nm and 10 nm, a compound having the formula $SiO_x \cdot (M_aO_b)_y$, with $0<x<1$ and $0 \leq y<1$, wherein a and b are selected to provide electro neutrality, and wherein M is selected from one or more of the group consisting of Ca, Mg, Li, Al, and Zr, and SiO.

4. The process according to claim 1, wherein the negative electrode further comprises one or both of micrometric graphite and a nanometric Si compound, the nanometric Si compound having a particle size distribution with 50 nm<D80<200 nm.

5. The process according to claim 1, wherein the conductive agent comprises a carbon powder.

6. The process according to claim 1, wherein the step of providing the negative electrode comprises:

provide the micrometric Si based active material, providing the polymeric binder material, providing the conductive agent, and mixing the Si based active material, the polymeric binder material and the conductive agent in a buffered slurry solution at a pH between 2.5 and 3.5, whereby at least part of the surface of the Si based active material is covered by the Si—OCO—R group, Si being part of the active material, and R being the polymeric chain of the binder material, tape casting the slurry on a copper foil, and drying the tape in vacuum.

7. The process according to claim 6, wherein the buffered slurry solution comprises citric acid and KOH, and is at pH 3.

* * * * *